(12) United States Patent
Waelchli et al.

(10) Patent No.: US 6,357,116 B1
(45) Date of Patent: Mar. 19, 2002

(54) METHOD FOR ASSEMBLY OF VEHICLE WHEELS

(75) Inventors: Erik Waelchli; Tad A. Dickerson, both of South Bend, IN (US); Timothy J. Haynie, Union, MI (US)

(73) Assignee: Hess Engineering, Inc., Niles, MI (US)

( * ) Notice: Subject to any disclaimer, the term of this patent is extended or adjusted under 35 U.S.C. 154(b) by 0 days.

(21) Appl. No.: 09/159,194

(22) Filed: Sep. 23, 1998

Related U.S. Application Data

(60) Provisional application No. 60/060,013, filed on Sep. 25, 1997.

(51) Int. Cl.⁷ .................................................. B23P 17/00
(52) U.S. Cl. ...................... 29/894.322; 29/252; 29/446; 29/802; 29/525
(58) Field of Search ........................... 29/802, 894.322, 29/251, 252, 525, 446

(56) References Cited

U.S. PATENT DOCUMENTS

| | | |
|---|---|---|
| 4,646,434 A | 3/1987 | Daudi |
| 4,841,622 A | 6/1989 | Murano et al. |
| 5,029,385 A | 7/1991 | Daniels |
| 5,193,274 A | 3/1993 | Ball et al. |

FOREIGN PATENT DOCUMENTS

| | | |
|---|---|---|
| JP | 62-236345 | 9/1987 |
| JP | 62-236346 | 9/1987 |

*Primary Examiner*—P. W. Echols
(74) *Attorney, Agent, or Firm*—Baker & Daniels

(57) ABSTRACT

An apparatus and method for installing a wheel disc into a wheel rim to manufacture a vehicle wheel includes upper and lower disc engaging members, which are clamped against opposite sides of the disc, and upper and lower rim engaging members, which engage upper and lower edges of the rim. The disc is first separated from the rim to assure proper alignment between the disc and rim and then forced into frictional engagement with the rim, while a compressive force is applied axially along the rim to relieve stresses and facilitate installation of the disc into the rim.

26 Claims, 6 Drawing Sheets

METHOD FOR ASSEMBLY OF VEHICLE WHEELS

This application claims domestic priority based upon provisional U.S. patent application Ser. No. 60/060,013, filing Sep. 25, 1997.

This invention relates to an apparatus and method for installing a wheel disc into a wheel rim to assemble a vehicle wheel.

Vehicle wheels are critical components of a motor vehicle. If the component parts of a vehicle wheel are misassembled or out of alignment, vibrations, premature tire wear, and other problems may result. Accordingly, it is necessary to assure proper assembly of vehicle wheels in a cost effective manner.

Vehicle wheels include a wheel rim and wheel disc that is pressed into the rim and is then welded into place. If the wheel rim and wheel disc are out of alignment, the aforementioned vibrations and other problems may result. Accordingly, it is very important to assure that the axis of the disc is coaxial with the axis of the rim, which is also the axis of rotation of the wheel when mounted on the vehicle. The wheel disc includes a surface through which holes are drilled to accept the lugs extending from the wheel hub when the wheel and tire are installed on the vehicle. The rim includes a tire bead engaging surface which must be held parallel to the aforementioned surface on the wheel disc.

The present invention relates to a machine having a pair of rim engaging members which include a surface engaging the tire bead engaging surfaces of the wheel, and also include a pair of disc engaging members which engage the central mounting portion of the wheel disc. The rim and disc are clamped between these members as the disc is installed in the rim. The bead engaging surfaces of the rim and the mounting surface on the disc are held parallel to one another, and the axis of the wheel disc is held coaxial with the axis of the rim. Accordingly, the critical surfaces of the wheel rim and disc are maintained in parallel alignment as the disc is installed in the rim in an expeditious manner.

These and other advantages of the present invention will become apparent from the following description, with reference to the accompanying drawings, in which.

Figure 1:
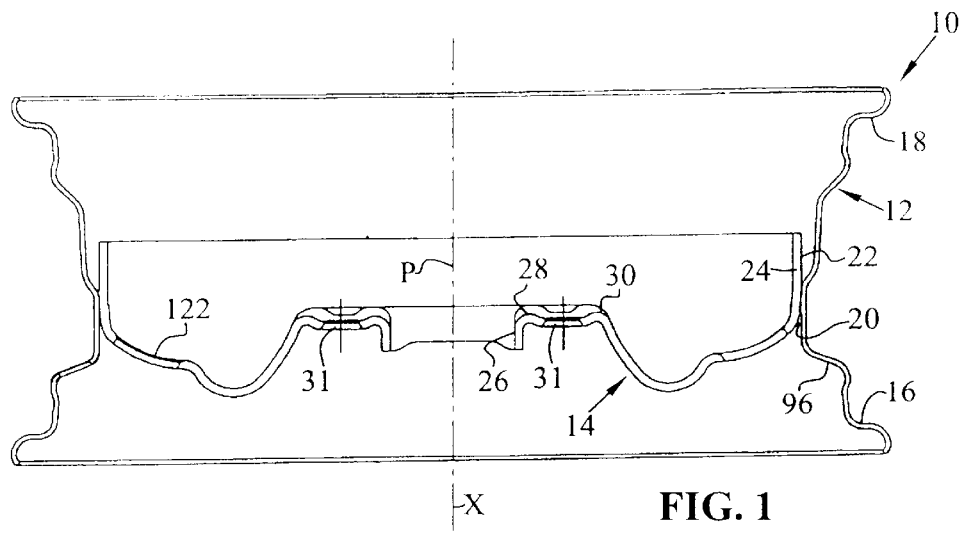
FIG. 1 is a transverse cross sectional view taken through a wheel rim and wheel disc assembly and illustrating the relative position of the rim and disc before the disc is installed in the rim in its final position.
Figure 2:
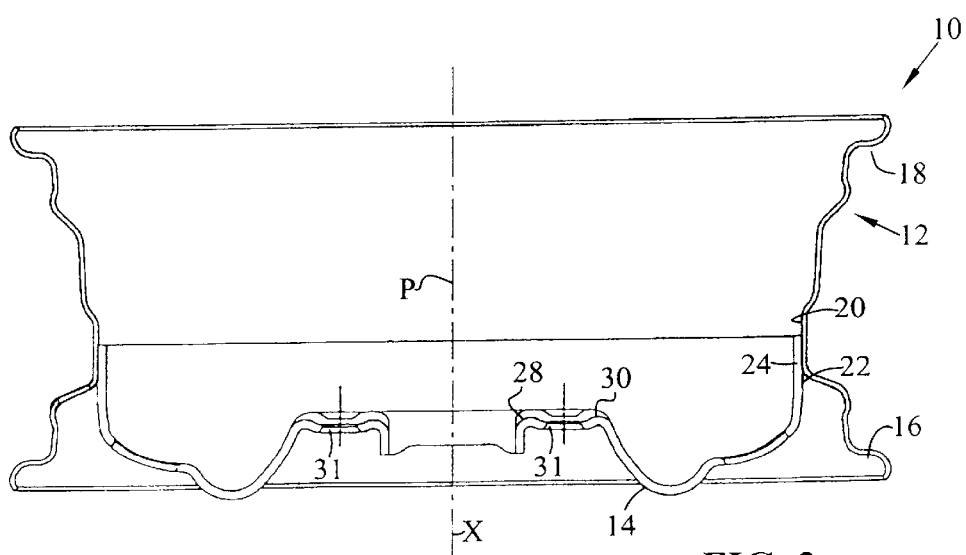
FIG. 2 is a view similar to FIG. 1 but illustrating the wheel assembly after the wheel disc has been installed in the final position within the wheel rim.

Referring now to FIGS. 1 and 2 of the drawings, a wheel assembly generally indicated by the numeral 10 includes a wheel rim 12 and a wheel disc 14. In FIG. 1, the wheel disc 14 is illustrated as being lightly pressed into the wheel rim 12 and before it is fully installed within the wheel rim 12 by the method and apparatus of the present invention. In FIG. 2, the wheel disc 14 is illustrated fully installed within the wheel rim 12, to thereby form the final wheel assembly 10. After the wheel disc 14 is fully installed within the wheel rim 12, the wheel disc 14 is welded to the wheel rim 12 by a known process not a part of the present invention to complete the manufacture of the wheel assembly 10. As illustrated in FIGS. 1 and 2, the wheel disc 14 is coaxial with the wheel rim 12, and the wheel assembly 10 rotates about the axis indicated at X in FIGS. 1 and 2 when the wheel assembly 10 is installed in a motor vehicle. The rim 12 includes bead engaging surfaces 16 and 18, which engage the sides of the beads of the tire (not shown), to maintain the tire on the rim. The rim 12 further includes a circumferentially extending friction surface 20 on the inner diameter thereof which engages a corresponding friction surface 22 on axially extending skirt 24 of the disc 14 when the latter is forced into the position illustrated in FIG. 2. In FIG. 1, the surfaces 20 and 22 frictionally engage each other, but may be readily separated by applying an axial force to the rim 12 or disc 14.

The wheel disc 14 includes a central aperture 26 which receives a spindle or projecting portion of a wheel hub (not shown) when the wheel assembly 10 is installed on a vehicle. The aperture 26 is circumscribed by a pair of concentric ridges 28, 30 that cooperate to define a plane P. Circumferentially spaced apertures 31 are formed between the ridges 28, 30 and accept wheel lugs (not shown) projecting from the vehicle wheel hub when the wheel assembly 10 and tire (not shown) mounted thereon are mounted on the vehicle. To avoid wobble and vibration, it is necessary that the proper relationship between the plane P and the bead engaging surfaces 16 be maintained as the disc is forced into the FIG. 2 position, and also that the concentricity of the disc and rim be maintained. This is effected by the apparatus and method described below.

According to FIGS. 3–7, the disc 14 is installed in the rim 12 by an apparatus generally indicated by the numeral 32. Apparatus 32 includes an upper inserting assembly generally indicated by the numeral 34 which is installed on an upper platen 36 of a conventional press (not shown) by conventional retaining mechanisms generally indicated by the numeral 38. Apparatus 32 further includes a lower inserting assembly generally indicated by the numeral 40 which is installed on a lower platen 42 of the aforementioned conventional press. The platen 42 is moveable toward and away from the platen 36.

Figure 5:
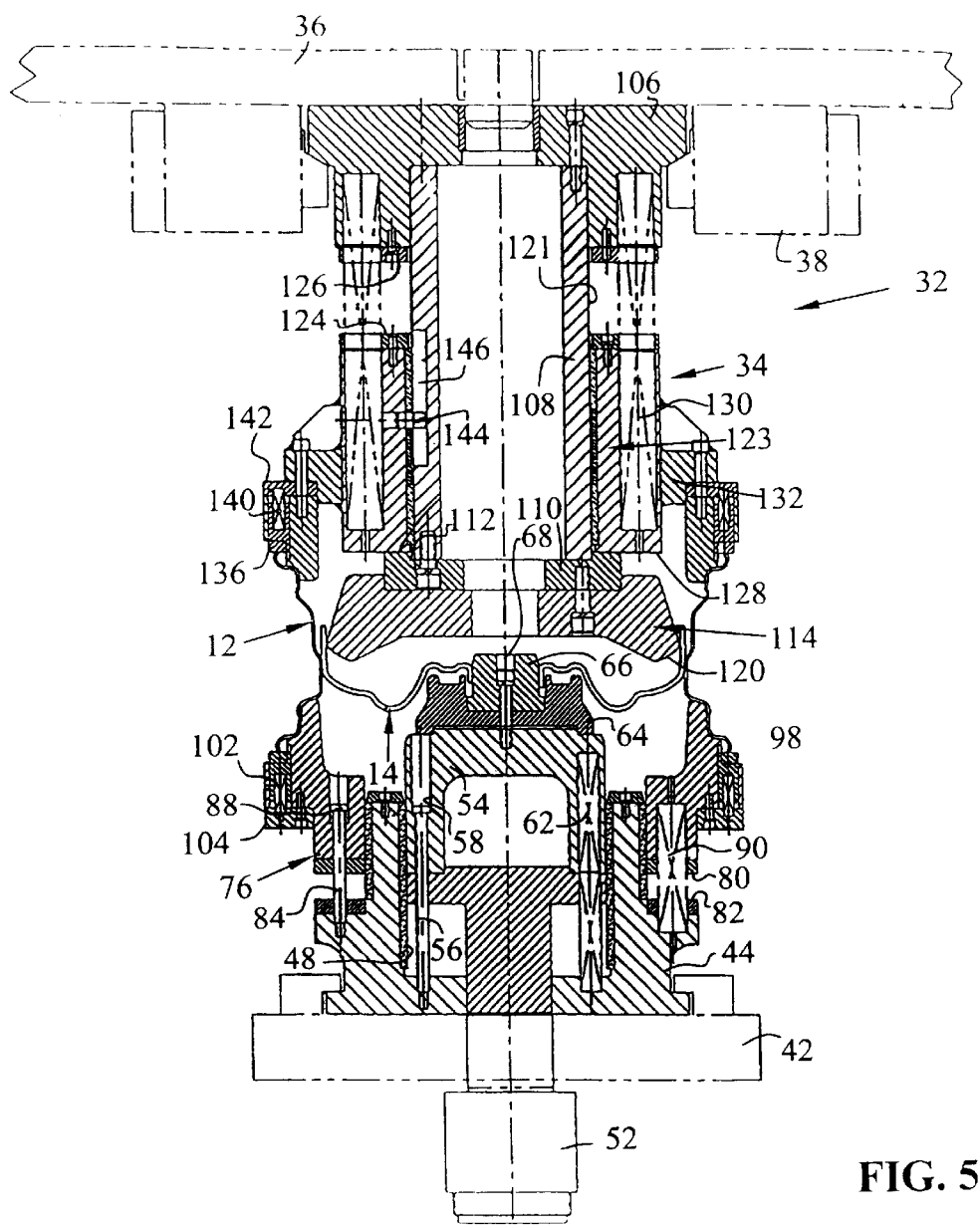

The lower inserting assembly 40 includes an upwardly projecting mounting member 44 which is secured to the lower platen 42 by securing device 46. Mounting member 44 includes an inner circumferential surface 48 which slidably receives a plunger 50 which is moved relative to the mounting member 44 independently of movement of platen 42 by an actuating cylinder 52 (FIG. 5). A piston 54 is slidably mounted coaxial with the plunger 50 for movement thereby. Stop bolts 56 include opposite ends one of which is secured to the mounting member 44 and the other of which is received in bore 58 within the piston 54 into which stop bolts 56 extend. Accordingly, the stop bolts 56 limit upward movement of the piston 54 relative to the mounting member 44 by engagement of the head of the stop bolt 56 with the bottom of the bore 58. Downward movement of the piston 54 is limited by engagement of the plunger 50 with stop surface 60 on the mounting member 44. Springs 62 yieldably urge the piston 54 upwardly viewing the Figures such that the head of the stop bolt 56 engages the bottom of the bore 58. An extension or lower disc engaging member 64 and hub 66 concentric with the extension 64 are secured to the piston 54 by a fastener 68. The hub 66 is received within aperture 26 of the disc 14 and engages the walls thereof to thereby orient the disc 14 and position the latter as it is installed in the rim 12 as will hereinafter be described. The extension 64 is provided with projections 70, 72 which are received within ridges 28, 30. A surface 74 extends between the projections 70, 72.

An annular rim engaging member indicated by the numeral 76 is slidably mounted for movement relative to outer circumferential surface 78 of the mounting member 44. The rim engaging member 76 terminates in a circumferentially extending stop surface 80 which is adapted to engage the radially outwardly projecting, circumferentially extending surface 82 on the mounting member 44 to limit downward movement of the rim engaging member 76. Stop bolts 84 extend through the stop surface 82 and are secured to the member 44. The stop bolts 84 extend into a corresponding one of multiple bores 86 provided in the rim engaging member 76. Stop bolts 84 terminate in a head 88, which is adapted to engage the lower end of the bores 86 to limit upward movement of the rim engaging member 76. Circumferentially spaced springs 90 yieldably urge the rim engaging member 76 upwardly, to bias the lower end of the bores 86 into engagement with the heads of stop bolts 88. The rim engaging member 76 further includes a lower rim engaging surface 92 which is adapted to engage the surface on the rim member 12 opposite the tire bead engaging surface 16, and an upper surface 94, which faces a surface 96 on the rim member 12, although some clearance may exist between the surfaces 94 and 96 since the important surface to be controlled is the bead engaging surface 16. A surface, 97 interconnects the surfaces 94 and 92, and extends along a corresponding surface on the rim member 12. A circumferentially extending, downwardly yielding engagement member 98 circumscribes rim engaging member 76 and is urged upwardly into engagement with a circumferentially extending radially outwardly projecting stop 100 by circumferentially spaced springs 102. Downward movement of the engagement member 98 is limited by the circumferentially extending outwardly projecting stop 104.

Upper inserting assembly 34 includes a fixture 106 extending downwardly from the upper platen 36. A cylinder 108 is secured to the fixture 106 and is coaxial therewith. A head 110 is secured to the lower end of the cylinder 108 and includes a portion projecting outwardly from the cylinder 108 to define a stop surface 112. A contoured disc engaging member generally indicated by the numeral 114 is mounted on the head 110. The disc engaging member 114 includes an aperture 116 that is adapted to receive the hub 66 as will be hereinafter described. Disc engaging member 114 further includes a central disc engaging portion 118 that is adapted to engage the portion of the disc 14 radially outwardly of the aperture 26 and is particularly adapted to engage the ridges 28, 30. The contoured disc engaging member further includes a downwardly projecting, circumferentially extending surface or inserting portion 120 that is adapted to engage a circumferentially extending surface 122 of the wheel disc 14 radially inwardly of the skirt 24. The cylinder 108 defines an outer sliding surface 121 which is slidably engaged by an upper rim engaging member generally indicated by the numeral 123. Upper rim engaging member 123 includes an upper stop surface 124 adapted to engage a radially outwardly projecting, circumferentially extending surface 126 on the fixture 106 to limit upward movement of the rim engaging member 123, and is also provided with a lower circumferentially extending surface 128 which is adapted to engage the stop surface 112 on head 110 to limit downward movement of the rim engaging member 123. Circumferentially spaced springs 130 yieldably urge the upper rim engaging member 123 downwardly to engage the stop surface 128 with the stop surface 112.

The upper rim engaging member 123 includes a radially outwardly extending portion generally indicated by the numeral 132 which carries a rim engaging surface 134 that is adapted to engage that part of the rim 12 opposite the bead engaging surface 18. The radially outwardly extending portion 132 further carries a circumferentially extending, deflectable engagement member 136 which is similar to the member 98 and is adapted to engage the upper edge of the rim 12 when the rim is installed in the apparatus 32. The engagement member 136 is yieldably urged into engagement with a radially outwardly projecting circumferentially extending stop 138 by circumferentially spaced springs 140. The springs 140 are retained by a member 142, which also serves as a stop for the engagement member 136, to limit upward movement thereof. Accordingly, the engagement member 136 is constrained to move between the stops 138 and 142. The upper rim engaging member 123 further includes an inwardly projecting key 144 which engages a slotted key way 146 which extends axially along the surface 121 of the cylinder 108 and prevents rotation of the rim engagement member 123 relative to the cylinder 108.

Figure 3:
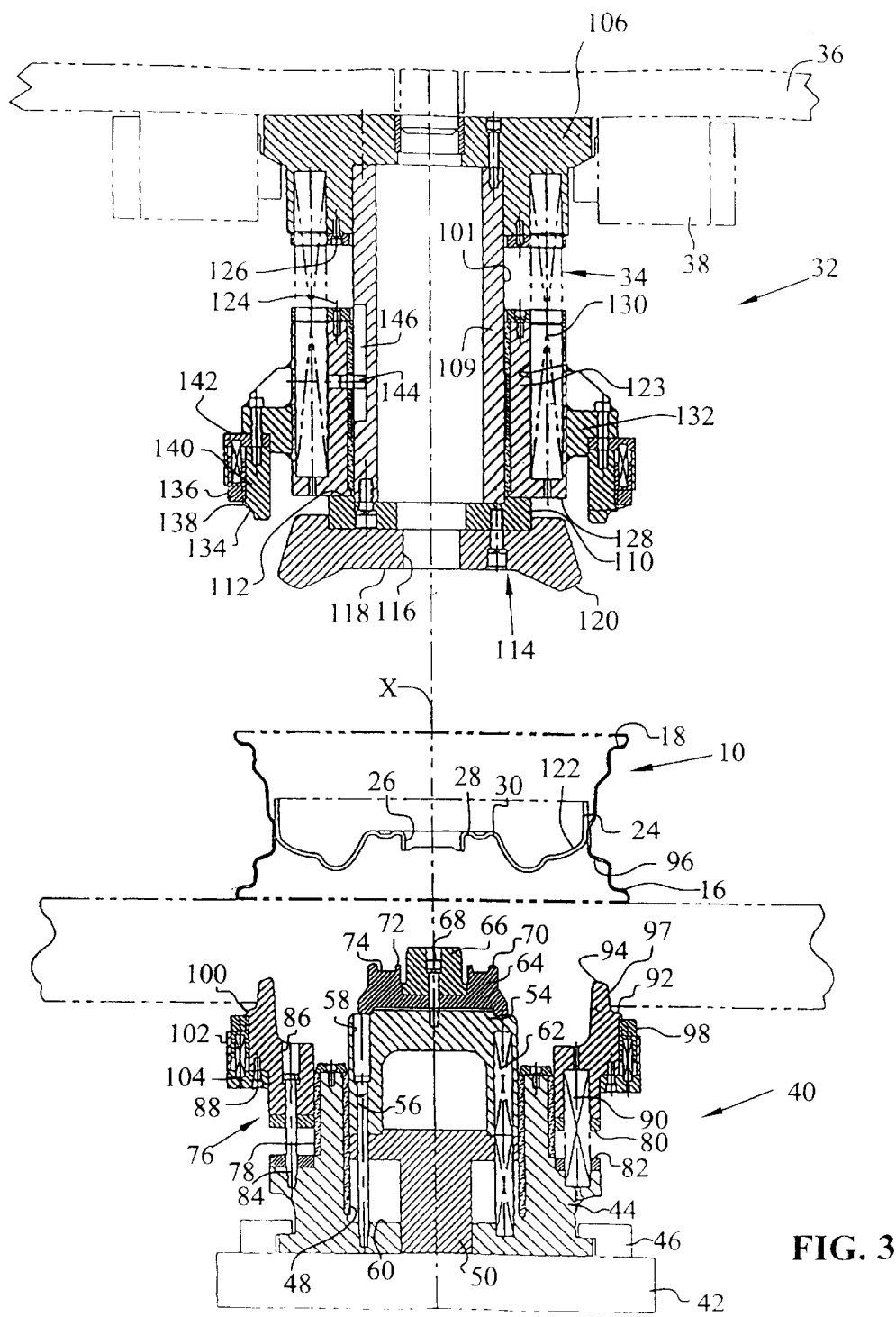
FIGS. 3–7 are cross sectional views taken through the assembly apparatus of the present invention which installs the wheel disc into the wheel rim; each of the FIGS. 3–7 showing a progressive step in the operation of the apparatus.
Figure 4:
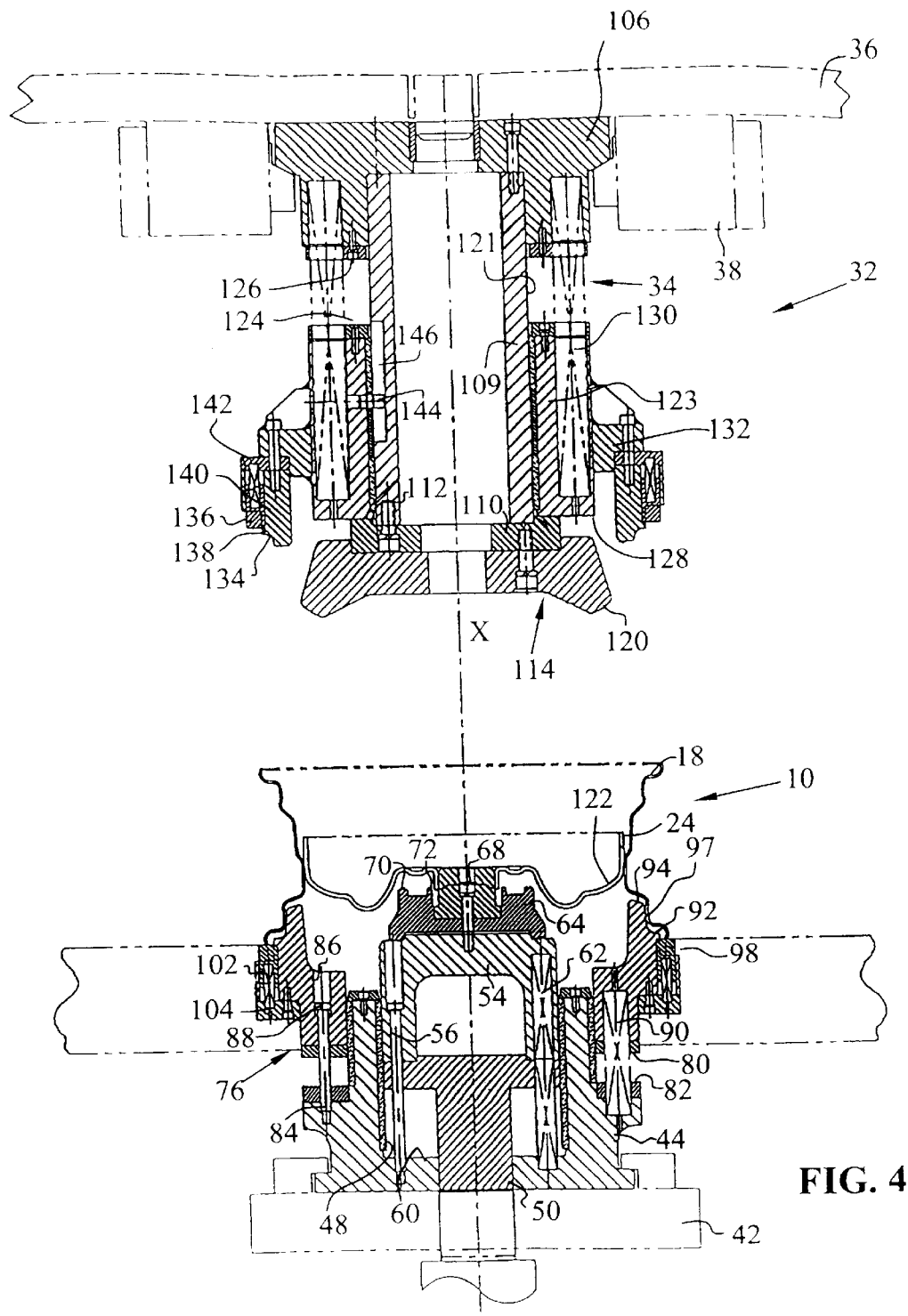

In operation, the wheel assembly 10, with the disc lightly pressed into the rim 12 is transferred by a conventional transfer operation to the position illustrated in FIG. 3, in which the axis X of the wheel 10 is in substantially axial alignment with the upper and lower inserting assemblies 34 and 40. The lower platen 42 is then raised to engage the lower rim engaging member 76 with the rim 12, as illustrated in FIG. 4. It will be noted in this position that the surfaces 92, 94 on the rim engaging member 76 are displaced from their final positions in engagement with the corresponding surfaces on the rim, that the lower edge of the rim merely rests on the lower engagement member 98 without depressing the spring 102 and that, although the hub 66 has been received in the aperture 26, the extension 64 is displaced from the disc. The lower platen 42 is then raised further to engage the upper edge of the rim with upper engagement member 136. Further upward movement of the platen 42 seats the rim on the upper and lower engaging members, thereby engaging the surface 92 of the lower rim engaging member with the corresponding surface of the rim and engaging the upper rim engaging surface 134 with the corresponding surface on the rim. As illustrated in FIG. 5, when this occurs, the upper disc engaging member 114 is received within the skirt 24 of the disc 14, but the disc has not been seated on the disc engaging member. It will be noted that the springs 90 have been compressed slightly to allow the lowering engaging member to move downwardly a small distance.

Figure 6:
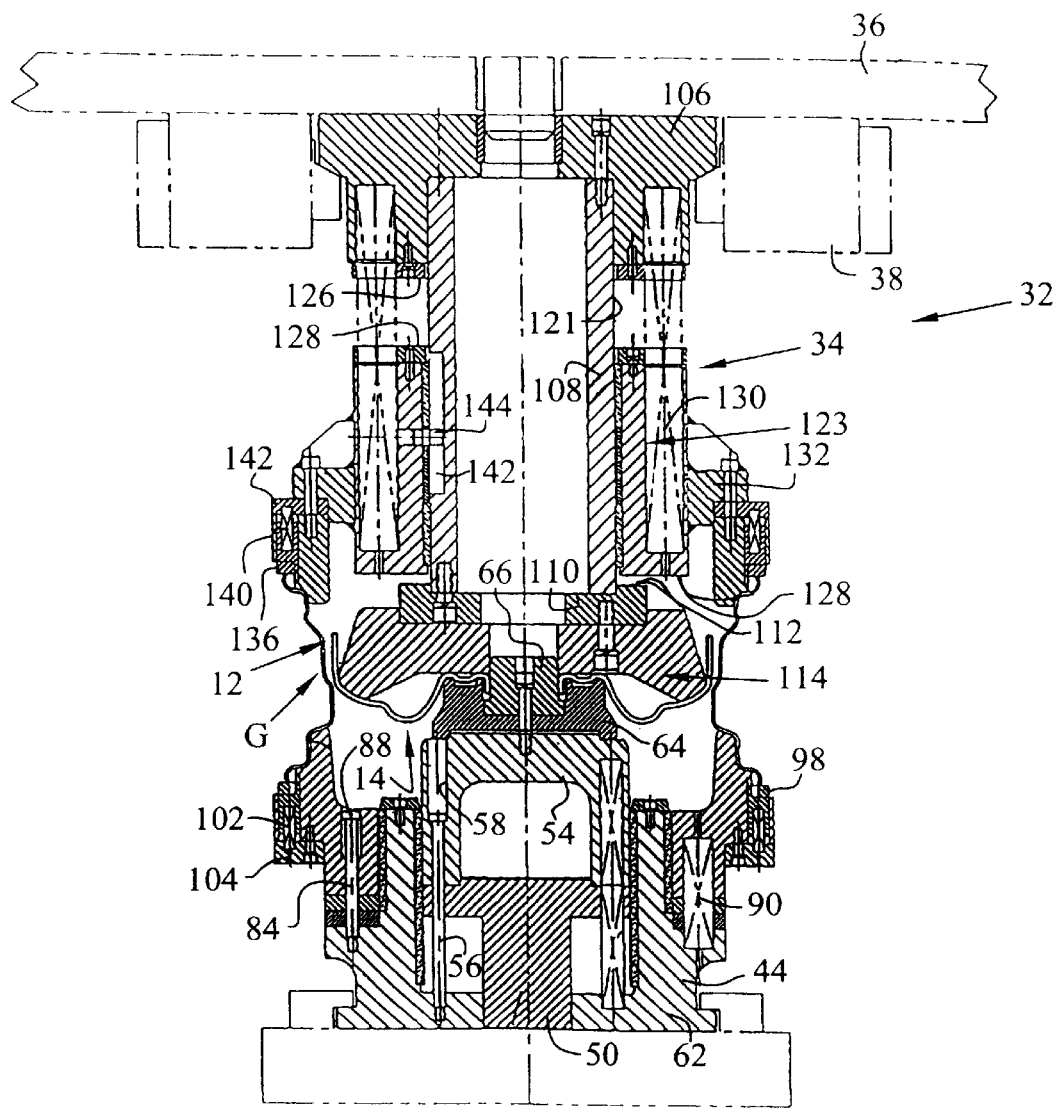

As discussed above, the springs, 90 exert a force on the lower rim engaging member 76 that is somewhat less than the force exerted on the upper rim engaging member 123 by the springs 130. Accordingly, in response to further upward movement of the lower platen 42 toward to the FIG. 6 position, lower rim engaging member 76 is moved downwardly relative to the mounting member 44 until the stop surface 80 engages the stop surface 82 as illustrated in FIG. 6. At the same time, the upper disc engaging member 114 is fully seated within the disc 14, and the lower disc engaging member 64 is fully seated on the opposite side of the disc, such that the disc 14 is clamped between the upper disc engaging member 114 and lower disc engaging member 64. It will be noted that the hub 66 is received within the aperture 116 of the upper disc engaging member and thus extends through the aperture 26 of the disc. It will also be noted that the ridges 28, 30 are fully seated on the projections 70, 72. Since during the seating operation of the disc engaging members the rim has moved downwardly relative to the disc engaging members, a relatively small gap G is opened between the wheel rim 12 and wheel disc 14. Since the disc 14 is clamped between the disc engaging members, the separation of the disc from the rim allows the rim and disc to be brought in proper axial and parallel alignment, since the loose fit between the disc and the rim illustrated in FIG. 1 may not assure that the disc and rim are coaxial and parallel. It will also be noted that the lower stop surface 128 of the upper rim engaging member 123 has been moved from the stop surface 112. Since the disc is clamped between the upper disc engaging member 114 and lower disc engaging member 64 and, the upper and lower rim engaging members 123, 76 have been engaged with the corresponding surfaces on the rim opposite the tire bead engaging surfaces 18 and 16, and the proper axial relationship between the inner portion of the disc containing the apertures 31 and the tire bead engaging surfaces on the rim is assured.

Figure 7:
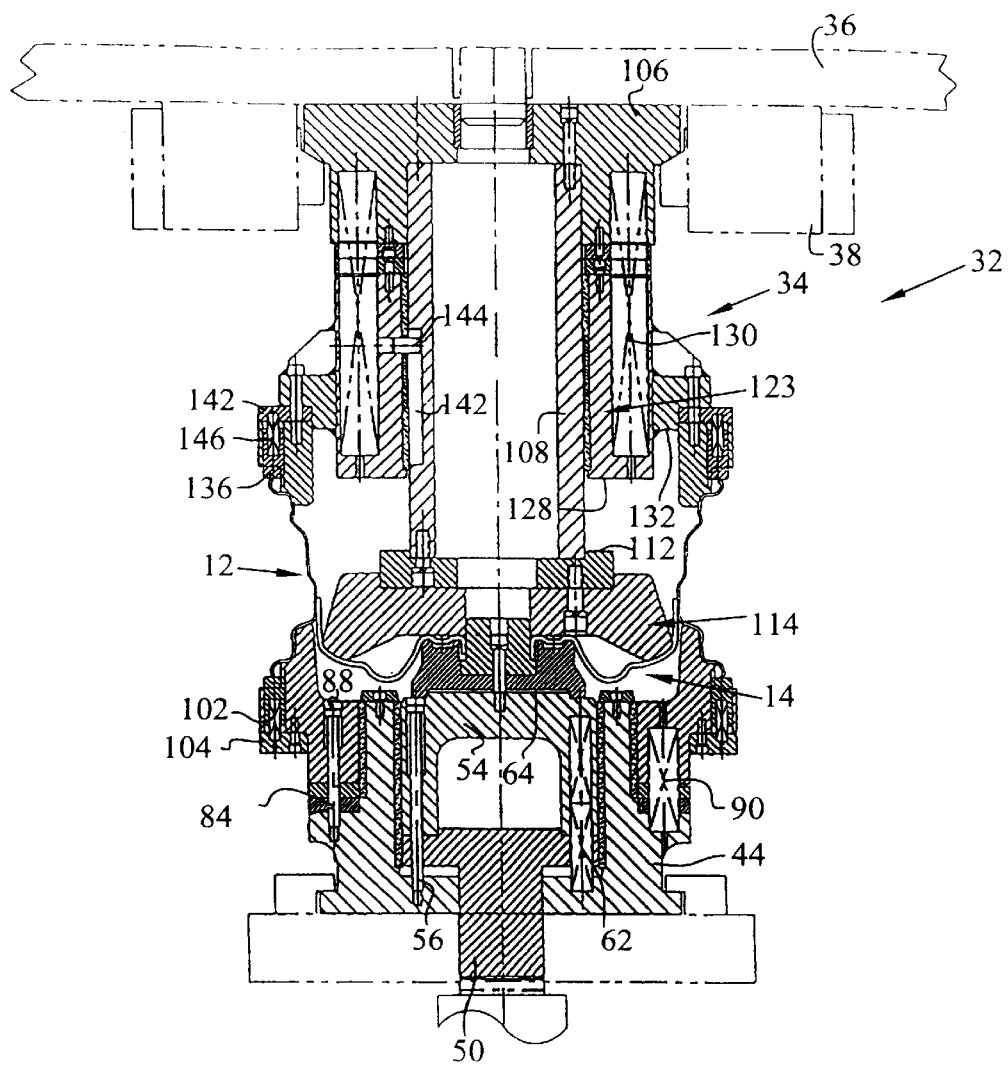

Further upward movement of the lower platen 42 forces the upper and lower rim engaging members 123 and 76 into the positions illustrated in FIG. 7. In this position, the lower stop surfaces 82, 80 are of the mounting member 44 and the lower rim engaging member 76, respectively are engaged with one another, and the surfaces 124, 126 of the upper rim engaging member 123 and the upper fixture 106, respectively are also engaged with one another. A small additional upward movement of the lower platen 42 is then effected thereby providing an axial directed compressive force on the rim, thereby controlling stresses within the rim to allow the disc to be properly seated in the rim. At the same time, the plunger 50 is permitted to move downward relative to the platen 42 as the latter is moved upwardly, thereby allowing the disc engaging members 114, 64 to seat the disc within the rim in its final position illustrated in FIG. 2, it being noted that the outer circumferential surface 22 of the skirt 24 frictionally engages the surface 20 of the rim 12 with a tight friction fit in which the disc and the rim are coaxial with one another due to the clamping of the disc and rim between the corresponding upper and lower disc engaging member and the upper and lower rim engaging members respectively. Since the portion of the disc through which the apertures 31 are provided is held parallel to the tire bead engaging surfaces 16 and 18, undesirable wobble is avoided. The wheel is removed from the apparatus 34 by separating the platens and then removing the wheel in the normal way. The wheel may then be transferred to machinery in which a welding operation is performed to secure the disc to the rim.

What is claimed is:

1. Method of installing a wheel disc into a wheel rim to assemble a vehicle wheel comprising the steps of providing a wheel disc and wheel rim assembly wherein said disc is pre-engaged with said rim, engaging axially offset surfaces of said rim with coaxial rim engaging members, engaging said disc with disc engaging members, disengaging said disc from said rim to permit alignment of the disc with the rim before the disc is fully inserted into the rim, and forcing said disc into the rim by moving said members relative to one another while maintaining the rim coaxial with the disc.

2. Method as claimed in claim 1, wherein said disc includes opposite transversely extending sides and said method includes engaging one of a pair of said disc engaging members with a corresponding one of said sides thus limiting axial deflection of said disc and maintaining the disc coaxial with the rim as the disc is forced into said rim.

3. Method as claimed in claim 2, wherein said axially offset surfaces of the rim are opposite tire bead engaging surfaces on the rim.

4. Method as claimed in claim 2, wherein said disc engaging members are engaged with clamping areas on said opposite sides of said disc extending radially outwardly from the axis of said disc.

5. Method as claimed in claim 4, wherein one of said disc engaging members includes an inserting portion engaging one side of said disc in an area offset radially from said clamping area.

6. Method as claimed in claim 1, wherein said method includes the step of compressing said rim axially as the disc is installed into the rim.

7. Method as claimed in claim 6 wherein said rim is compressed by moving said rim engaging members toward one another.

8. Method as claimed in claim in claim 1, wherein said disc includes opposite transversely extending sides and said method includes engaging one of a pair of said disc engaging members with a corresponding one of said sides, said disc being disengaged from the rim by moving said rim engaging members and said disc engaging members relative to one another to thereby move the disc away from the rim.

9. Method of installing a wheel disc into a wheel rim to assemble a vehicle wheel comprising the steps of providing a pair of coaxial rim engaging members each having a support surface for supporting an area of the rim opposite bead engaging surfaces and further having a yieldable engagement member for engaging an edge of the rim, engaging transversely extending opposite sides of said disc with disc engaging members to thereby maintain the disc in a predetermined plane, engaging the edges of said rim with said yieldable engagement members, moving said yieldable engagement members relative to the respective support surface of each rim engaging member, and forcing said disc into the rim by moving said members relative to one another while maintaining the disc coaxial with the rim.

10. Method as claimed in claim 9, wherein said rim includes a pair of axially offset areas and said method includes engaging one of a pair of said rim engaging members with a corresponding one of said axially offset areas and engaging the other axially offset area with the other of said pair of rim engaging members.

11. Method as claimed in claim 9, wherein said disc engaging members are engaged with clamping areas on said opposite sides of said disc extending radially outwardly from the axis of said disc.

12. Method as claimed in claim 11, wherein one of said disc engaging members includes an inserting portion engaging one side of said disc offset radially from said clamping area.

13. Method as claimed in claim 11, wherein said clamping areas include means for attaching said wheel to a vehicle and said rim includes axially offset tire bead engaging surfaces, said method including the step of engaging surfaces opposite each of said tire bead engaging surfaces with a corresponding one of the rim engaging members whereby said tire bead engaging surfaces and said clamping areas are maintained coaxial as the disc is installed in the rim.

14. Method as claimed in claim 9, wherein said disc engaging members engage the disc on opposite sides of concentric ridges.

15. Method as claimed in claim 18, wherein one rim engaging member is attached to a first base and the other rim engaging member is attached to a second base, and further comprising the step of moving the support surfaces relative to and closer to each respective base as said disc is being installed into said rim.

16. Method as claimed in claim 15 wherein the support surface of the rim engaging member connected to the first base moves relatively closer to the first base before the other support surface moves relatively closer to the second base.

17. Method of installing a wheel disc having a rim engaging surface into a wheel rim having a disc engaging surface defining a recess for receiving said rim to assemble a vehicle wheel rotatable about an axis comprising the steps of providing a pair of bases and a pair of coaxial rim engaging members wherein each rim engaging member has a support surface for supporting an area of the rim opposite bead engaging surfaces and wherein one rim engaging member is connected to one base and the other rim engagement member is connected to the other base, engaging said rim with said support surfaces, engaging the disc with disc engaging members, engaging the rim engaging surface with the disc engaging surface, moving said support surfaces relative to one another, moving each support surface closer to the base to which it is connected, and forcing said disc into said recess while compressing said rim to control stresses.

18. Method as claimed in claim 17, wherein said rim is compressed axially.

19. Method as claimed in claim 18, wherein said rim is engaged by a pair of axially offset rim engagement members, and said rim is compressed by moving one of said rim engagement members relative to the other rim engagement member.

20. Method as claimed in claim 19, wherein said disc is engaged with said rim before the rim is engaged by said rim engaging members, said method including the step of disengaging said disc from said rim to permit alignment of the disc with the rim before the disc is fully inserted into the rim.

21. Method as claimed in claim 20, wherein said disc is engaged with disc engaging members, said disc being disengaged from the rim by moving said rim engaging members and said disc engaging members relative to one another to thereby move the disc away from the rim.

22. Method as claimed in claim 17 wherein one of said support surfaces moves closer to the respective connected base before the other support surface moves closer to the other base.

23. Method as claimed in claim 17 wherein the co-axial rim engaging members each have a yieldable engagement member and further comprising the step of moving each yieldable engagement member relative to the respective support surface.

24. Method of installing a wheel disc having a rim engaging surface into a wheel rim to assemble a vehicle wheel rotatable about an axis comprising the steps of providing a wheel rim and a wheel disc with the wheel disc removably engaged with the rim, disengaging said disc from said rim to permit alignment of the disc with the rim before the disc is inserted into the rim, and then inserting the disc fully into the rim.

25. Method as claimed in claim 24, wherein said rim is engaged by rim engaging members and said disc is engaged with disc engaging members, said disc being disengaged from said rim by moving said members relative to one another to disengage said disc from said rim, said disc being installed in said rim by moving said disc engaging members relative to the rim engaging members in a direction forcing said disc into said rim.

26. Method as claimed in claim 24, wherein said rim includes a circumferentially extending disc engaging surface defining a recess for receiving said disc and said disc includes a circumferentially extending rim engaging surface, said rim being provided with the disc partially engaging said disc engaging surface, said method including the step of forcing said disc out of the recess to disengage said disc from said rim to achieve axial alignment between the disc and the rim before inserting the disc fully into the rim.

* * * * *

UNITED STATES PATENT AND TRADEMARK OFFICE
CERTIFICATE OF CORRECTION

PATENT NO. : 6,357,116 B1
DATED : March 19, 2002
INVENTOR(S) : Erik Waelchli et al.

It is certified that error appears in the above-identified patent and that said Letters Patent is hereby corrected as shown below:

<u>Column 6,</u>
Line 7, delete first "in claim"
Line 56, delete "surfaces" and insert -- services --

Signed and Sealed this

Twenty-eighth Day of May, 2002

Attest:

JAMES E. ROGAN
*Attesting Officer*   *Director of the United States Patent and Trademark Office*